(12) United States Patent
Sumiya et al.

(10) Patent No.: US 11,984,735 B2
(45) Date of Patent: May 14, 2024

(54) DYNAMIC WIRELESS POWER TRANSFER SYSTEM

(71) Applicants: DENSO CORPORATION, Kariya (JP); The University of Tokyo, Tokyo (JP)

(72) Inventors: Hayato Sumiya, Kariya (JP); Eisuke Takahashi, Kariya (JP); Nobuhisa Yamaguchi, Kariya (JP); Masaya Takahashi, Kariya (JP); Hiroshi Fujimoto, Tokyo (JP); Osamu Shimizu, Tokyo (JP)

(73) Assignees: DENSO CORPORATION, Kariya (JP); THE UNIVERSITY OF TOKYO, Tokyo (JP)

( * ) Notice: Subject to any disclaimer, the term of this patent is extended or adjusted under 35 U.S.C. 154(b) by 193 days.

(21) Appl. No.: 17/585,195

(22) Filed: Jan. 26, 2022

(65) Prior Publication Data

US 2022/0149666 A1    May 12, 2022

Related U.S. Application Data

(63) Continuation of application No. PCT/JP2020/026557, filed on Jul. 7, 2020.

(30) Foreign Application Priority Data

Jul. 26, 2019 (JP) ................................. 2019-137399

(51) Int. Cl.
*H02J 50/50* (2016.01)
*B60C 9/00* (2006.01)
(Continued)

(52) U.S. Cl.
CPC .............. *H02J 50/50* (2016.02); *B60C 19/00* (2013.01); *B60L 53/122* (2019.02);
(Continued)

(58) Field of Classification Search
CPC .......... H02J 50/50; H02J 50/12; H02J 50/005; B60L 53/122; B60C 19/00; B60C 9/0007
(Continued)

(56) References Cited

U.S. PATENT DOCUMENTS

| RE19,633 E | 7/1935 | Baughman |
| 8,008,888 B2 | 8/2011 | Oyobe et al. |

(Continued)

FOREIGN PATENT DOCUMENTS

| CN | 110549799 A | 12/2019 |
| JP | 2009-184521 A | 8/2009 |

(Continued)

OTHER PUBLICATIONS

Sep. 19, 2023 Office Action Issued in U.S. Appl. No. 17/580,380.
(Continued)

*Primary Examiner* — Michael R. Fin
(74) *Attorney, Agent, or Firm* — Oliff PLC

(57) ABSTRACT

A dynamic wireless power transfer system includes a power transmission coil, a power transmission circuit, a power reception coil, a power reception circuit, and a relay circuit. The power transmission coil is provided in a road. The power transmission circuit supplies electric power to the power transmission coil. The power reception coil is provided in a vehicle. The power reception circuit is connected to the power reception coil. The relay circuit transfers electric power between the power transmission coil and the power reception coil in a contactless manner.

16 Claims, 17 Drawing Sheets

(51) Int. Cl.
    *B60C 19/00*     (2006.01)
    *B60L 53/122*     (2019.01)
    *H02J 50/00*     (2016.01)
    *H02J 50/12*     (2016.01)

(52) U.S. Cl.
    CPC ............ *H02J 50/005* (2020.01); *H02J 50/12* (2016.02); *B60C 9/0007* (2013.01)

(58) Field of Classification Search
    USPC .................................................. 307/10.1, 104
    See application file for complete search history.

(56) References Cited

U.S. PATENT DOCUMENTS

| | | |
|---|---|---|
| 9,531,217 B2 | 12/2016 | Horiuchi |
| 10,410,789 B2 | 9/2019 | Kurs |
| 11,641,053 B2 | 5/2023 | Fenkanyn et al. |
| 2004/0046646 A1 | 3/2004 | Eskridge |
| 2008/0084285 A1 | 4/2008 | Bhogal et al. |
| 2010/0225271 A1 | 9/2010 | Oyobe et al. |
| 2011/0031047 A1 | 2/2011 | Tarr |
| 2011/0121778 A1 | 5/2011 | Oyobe et al. |
| 2011/0298422 A1 | 12/2011 | Failing |
| 2012/0032525 A1 | 2/2012 | Oyobe et al. |
| 2012/0116694 A1 | 5/2012 | Norair |
| 2015/0210170 A1 | 7/2015 | Oyobe et al. |
| 2015/0251546 A1 | 9/2015 | Oyobe et al. |
| 2016/0023557 A1 | 1/2016 | Dimke et al. |
| 2017/0373541 A1 | 12/2017 | Shimokawa et al. |
| 2020/0130437 A1 | 4/2020 | Root et al. |
| 2022/0063415 A1 | 3/2022 | Wakao et al. |
| 2022/0288974 A1 | 9/2022 | Kuwayama |

FOREIGN PATENT DOCUMENTS

| | | |
|---|---|---|
| JP | 2011-130614 A | 6/2011 |
| JP | 2012-157231 A | 8/2012 |
| JP | 2013-051744 A | 3/2013 |
| JP | 2016-220353 A | 12/2016 |
| JP | 2016-226072 A | 12/2016 |
| JP | 2017-093113 A | 5/2017 |
| JP | 2021-023002 A | 2/2021 |
| JP | 2021-023003 A | 2/2021 |
| KR | 10-1217655 B1 | 1/2013 |

OTHER PUBLICATIONS

Sep. 24, 2020 International Search Report issued in International Patent Application No. PCT/JP2020/026557.
Sep. 29, 2020 International Search Report issued in International Patent Application No. PCT/JP2020/027803.
U.S. Appl. No. 17/580,380, filed Jan. 20, 2022 in the name of Hayato SUMIYA et al.

DYNAMIC WIRELESS POWER TRANSFER SYSTEM

CROSS-REFERENCE TO RELATED APPLICATIONS

The present application is a continuation application of International Application No. PCT/JP2020/026557, filed on Jul. 7, 2020, which claims priority to Japanese Patent Application No. 2019-137399, filed on Jul. 26, 2019. The contents of these applications are incorporated herein by reference in their entirety.

BACKGROUND

Technical Field

The present disclosure relates to a dynamic wireless power transfer system.

Related Art

A dynamic wireless power transfer system that supplies electric power to a moving body such as a vehicle that is travelling in a contactless manner is known. This dynamic wireless power transfer system includes a power transmission coil and a power reception coil. The power transmission coil is embedded on a ground side. The power reception coil is mounted under a floor of the vehicle. In the dynamic wireless power transfer system, electric power is transferred from the power transmission coil embedded on the ground side to the power reception coil mounted to the vehicle in a contactless manner.

SUMMARY

An aspect of the present disclosure provides a dynamic wireless power transfer system that includes a power transmission coil, a power transmission circuit, a power reception coil, a power reception circuit, and a relay circuit. The power transmission coil is provided in a road. The power transmission circuit supplies electric power to the power transmission coil. The power reception coil is provided in a vehicle. The power reception circuit is connected to the power reception coil. The relay circuit transfers electric power between the power transmission coil and the power reception coil in a contactlessing manner.

DESCRIPTION OF THE EMBODIMENTS

Embodiments of the present disclosure relate to a dynamic wireless power transfer system that supplies electric power to a moving body such as a vehicle that is traveling.

JP-A-2016-220353 discloses a dynamic wireless power transfer system. In the dynamic wireless power transfer system, electric power is transferred from a power transmission coil that is embedded on a ground side to a power reception coil that is mounted under a floor of a vehicle.

In a method in JP-A-2016-220353, because there is a large distance between the power transmission coil and the power reception coil, increasing power transmission efficiency is difficult. In addition, there is also an issue in that the distance between the power transmission coil and the power reception coil changes depending on the vehicle.

An exemplary embodiment of the present disclosure provides a dynamic wireless power transfer system. This dynamic wireless power transfer system includes: a power transmission coil that is provided in a road; a power transmission circuit that supplies electric power to the power transmission coil; a power reception coil that is provided in a vehicle; a power reception circuit that is connected to the power reception coil; and a relay circuit that transfers electric power between the power transmission coil and the power reception coil in a contactless manner. As a result of this aspect, because electric power is transferred from the power transmission coil to the power reception coil through the relay coil, a distance between the power transmission coil and the power reception coil need not be considered. An issue in that the distance between the power transmission coil and the power reception coil changes depending on the vehicle also need not be considered.

First Embodiment

Figure 1A:
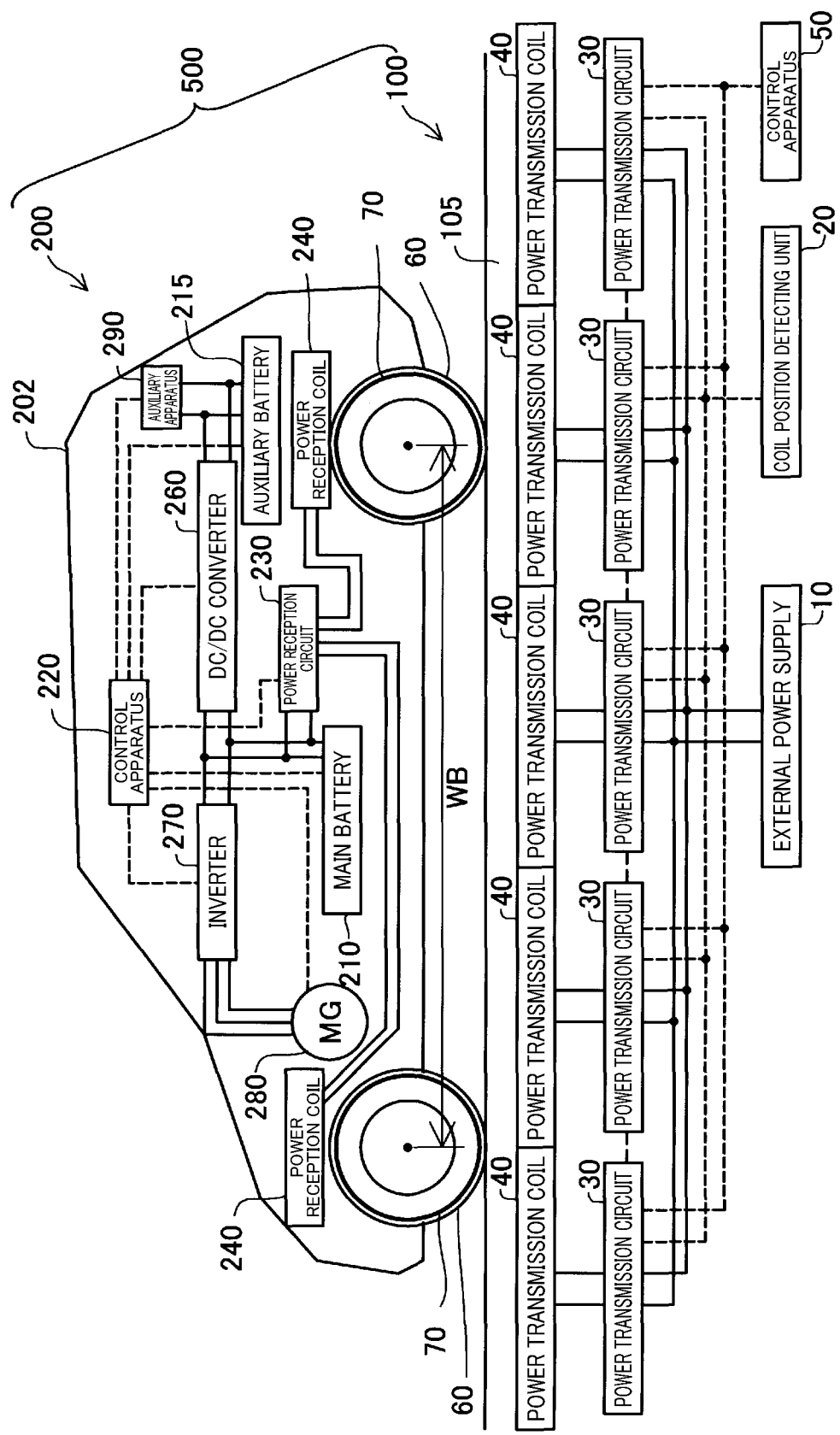
FIG. 1A is a block diagram of a dynamic wireless power transfer system.

As shown in FIG. 1A, a dynamic wireless power transfer system 500 includes a power transmission system 100 that is provided in a road 105 and a power reception system 200 on a vehicle 202 side. The dynamic wireless power transfer system 500 is a system that is capable of supplying electric power from the power transmission system 100 to the vehicle 202 while the vehicle 202 is traveling. For example, the vehicle 202 may be configured as an electric vehicle or a hybrid vehicle.

The power transmission system 100 on the road 105 side includes a plurality of power transmission coils 40, a plurality of power transmission circuits 30 that apply an alternating-current voltage to each of the plurality of power transmission coils 40 and supply electric power, an external power supply 10 (shortened hereafter to a power supply 10) that supplies electric power to the plurality of power transmission circuits 30, a coil position detecting unit 20, and a control apparatus 50.

The plurality of power transmission coils 40 are set along an advancing direction of the road 105. The power transmission circuit 30 is a circuit that converts a direct-current voltage that is supplied from the power supply 10 to a high-frequency alternating-current voltage, and applies the alternating-current voltage to the power transmission coil 40. The power transmission circuit 30 includes an inverter circuit, a filter circuit, and a resonance circuit. According to the present embodiment, the inverter circuit, the filter circuit, and the resonance circuit are known. Therefore, descriptions thereof are omitted. The power supply 10 is a circuit that supplies a direct-current voltage to the power transmission circuit 30. For example, the power supply 10 may supply the direct-current voltage to the power transmission circuit 30 from a system power supply through a power factor correction circuit (PFC). Illustration of the PFC is omitted. The direct-current voltage that is outputted from the power supply 10 may not be a full direct-current voltage and may include variations (ripples) to a certain extent.

The coil position detecting unit 20 detects a relative position of a relay circuit 70 that is mounted in a tire 60 of the vehicle 202 to the power transmission coil 40. For example, the coil position detecting unit 20 may detect the position of the relay circuit 70 based on a magnitude of transmitted power or transmitted current in the plurality of power transmission circuits 30. Alternatively, the coil position detecting unit 20 may detect the position of the relay circuit 70 using wireless communication with the vehicle 202 or a position sensor that detects a position of the vehicle 202. The control apparatus 50 makes one or more power transmission circuits 30 and power transmission coils 40 that are close to the relay circuit 70 perform power transmission based on the position of the relay circuit 70 that is detected by the coil position detecting unit 20.

The vehicle 202 includes a main battery 210, an auxiliary battery 215, a control apparatus 220, a power reception circuit 230, a power reception coil 240, a direct-current/direct-current (DC/DC) converter circuit 260, an inverter circuit 270, a motor generator 280, an auxiliary machine 290, and the tire 60. The power reception coil 240 is connected to the power reception circuit 230. The main battery 210, a high voltage side of the DC/DC converter circuit 260, and the inverter circuit 270 are connected to an output of the power reception circuit 230. The auxiliary battery 215 and the auxiliary machine 290 are connected on a low voltage side of the DC/DC converter circuit 260. The motor generator 280 is connected to the inverter circuit 270.

The tire 60 includes the relay circuit 70. The relay circuit 70 has a relay coil described hereafter. The relay coil will be described hereafter. The relay coil generates induced electromotive force by electromagnetic induction between the relay coil and the power transmission coil 40. The power reception coil 240 is arranged in a position in which inductive coupling with the relay coil in the tire 60 can be performed. The power reception coil 240 generates induced electromotive force by electromagnetic induction between the relay coil and the power reception coil 240. That is, the relay circuit 70 relays power supply from the power transmission coil 40 to the power reception coil 240.

The power reception circuit 230 includes a rectifier circuit that converts an alternating-current voltage that is outputted from the power reception coil 240 to a direct-current voltage. Here, the power reception circuit 230 may include a DC/DC converter circuit that converts the direct-current voltage that is generated in the rectifier circuit to a voltage that is suitable for charging of the main battery 210. The direct-current voltage that is outputted from the power reception circuit 230 can be used for charging of the main battery 210 and driving of the motor generator 280 through the inverter circuit 270. In addition, as a result of the direct-current voltage being stepped down using the DC/DC converter 260, the direct-current voltage can also be used for charging of the auxiliary battery 215 and driving of the auxiliary machine 290.

The main battery 210 is a secondary battery that outputs a relatively high direct-current voltage for driving the motor generator 280. The motor generator 280 operates as a three-phase alternating-current motor and generates driving force for traveling of the vehicle 202. The motor generator 280 operates as a generator during deceleration of the vehicle 202 and generates a three-phase alternating-current voltage. When the motor generator 280 operates as the motor, the inverter circuit 270 converts the direct-current voltage of the main battery 210 to a three-phase alternating-current voltage and supplies the motor generator 280 with the three-phase alternating-current voltage. When the motor generator 280 operates as the generator, the inverter circuit 270 converts the three-phase alternating-current voltage that is outputted from the motor generator 280 to a direct-current voltage and supplies the main battery 210 with the direct-current voltage.

The DC/DC converter circuit 260 converts the direct-current voltage of the main battery 210 to a direct-current voltage that is suitable for driving of the auxiliary machine 290 and supplies the auxiliary battery 215 and the auxiliary machine 290 with the direct-current voltage. The auxiliary battery 215 is a secondary battery that outputs a direct-current voltage for driving the auxiliary machine 290. The auxiliary machine 290 includes peripheral apparatuses such as an air-conditioning apparatus, an electric power steering apparatus, headlights, a turn signal, and windshield wipers of the vehicle 202 and various accessories of the vehicle 202. The DC/DC converter circuit 260 may not be provided.

The control apparatus 220 controls each section within the vehicle 202. The control apparatus 220 controls the power reception circuit 230 and performs power reception when dynamic wireless power transfer is received.

Figure 1B:
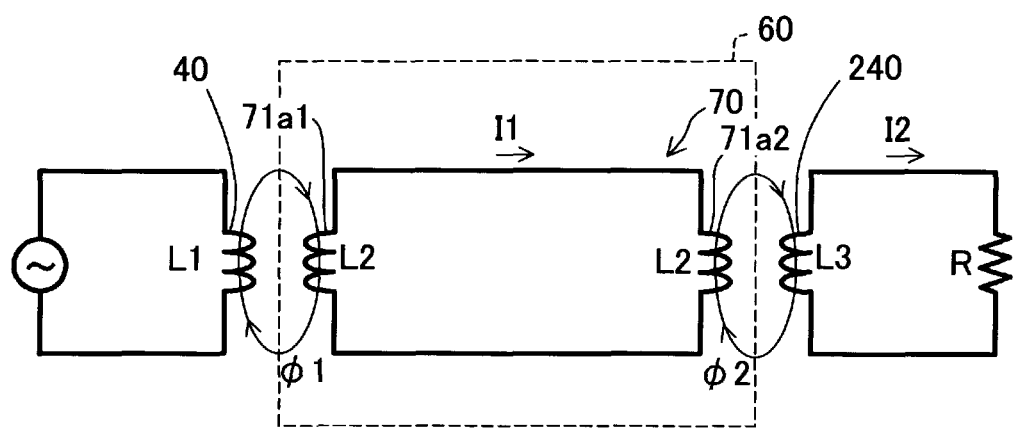
FIG. 1B is an explanatory diagram illustrating principles of transfer of electric power.

Principles of transfer of electric power from the power transmission coil 40 to the power reception coil 240 through the relay circuit 70 will be described with reference to FIG. 1B. The relay circuit 70 includes relay coils 71$a$1 and 71$a$2 that are connected in series. When an alternating current is applied to the power transmission coil 40, a varying magnetic flux φ1 is generated. When the tire 60 rotates and the power transmission coil 40 and the relay coil 71$a$1 oppose each other, the varying magnetic flux φ1 that is generated in the power transmission coil 40 penetrates the relay coil 71$a$1 and an induced current I1 that is an alternating current is generated in the relay coil 71$a$1. The induced current I1 also flows to the relay coil 71*a*2 that is connected in series, and a varying magnetic flux φ2 is generated in the relay coil 71*a*2. When the relay coil 71*a*2 and the power reception coil 240 oppose each other, the varying magnetic flux φ2 that is generated in the relay coil 71*a*2 penetrates the power reception coil 240 and an induced current I2 that is an alternating current is generated in the power reception coil 240. In this manner, electric power is transferred from the power transmission coil 40 to the power reception coil 240 through the relay circuit 70.

Figure 2:
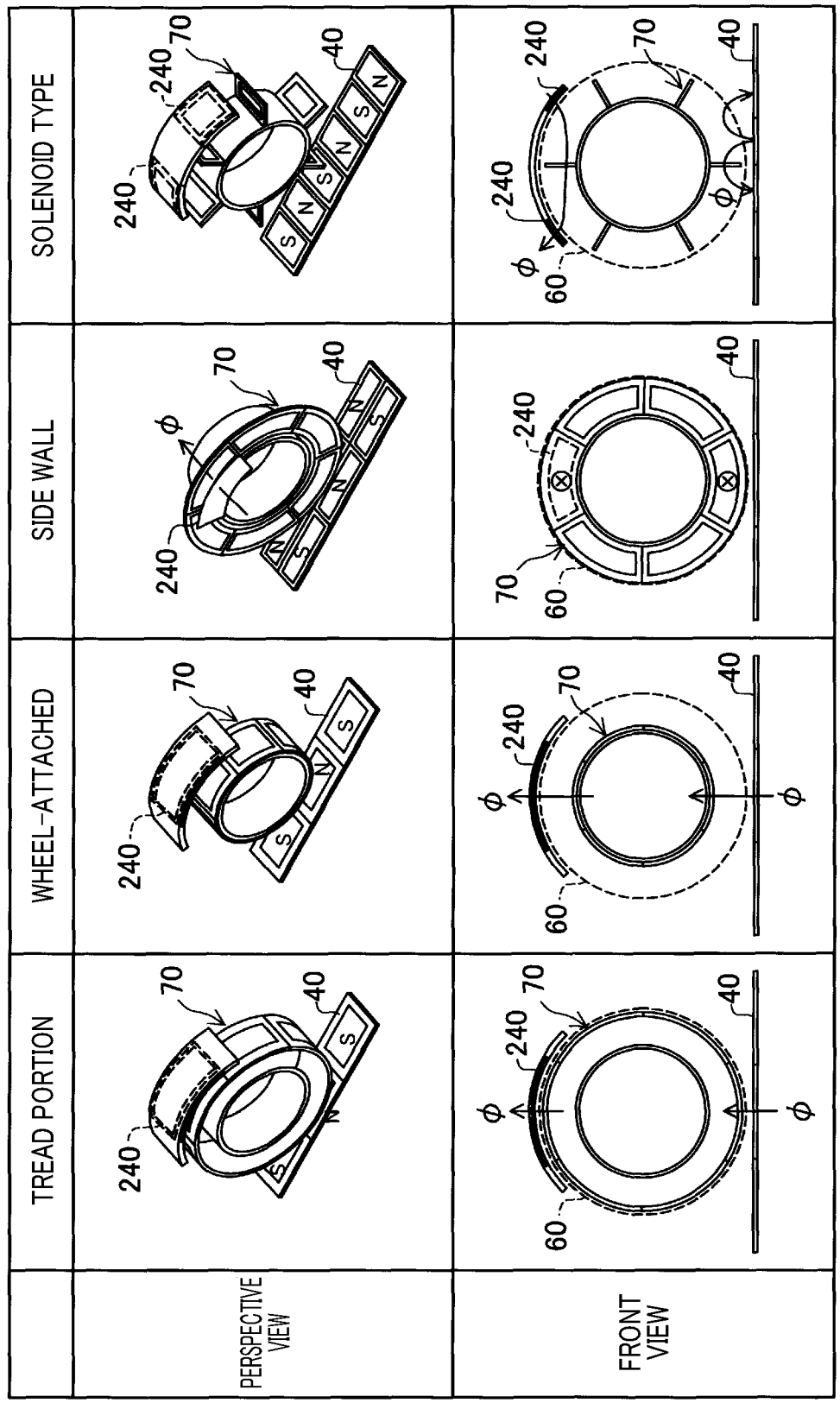
FIG. 2 is an explanatory diagram illustrating variations in an arrangement of a tire and a relay coil.

FIG. 2 shows variations in a position in the tire 60 in which the relay circuit 70 is arranged.

A tread portion type is a type in which the relay circuit 70 is provided on an outer circumference of the tire 60. The tread portion type allows a shortest distance between the power transmission coil 40 and the relay circuit 70. In addition, a distance between the relay circuit 70 and the power reception coil 240 can be shortened.

Figure 3A:
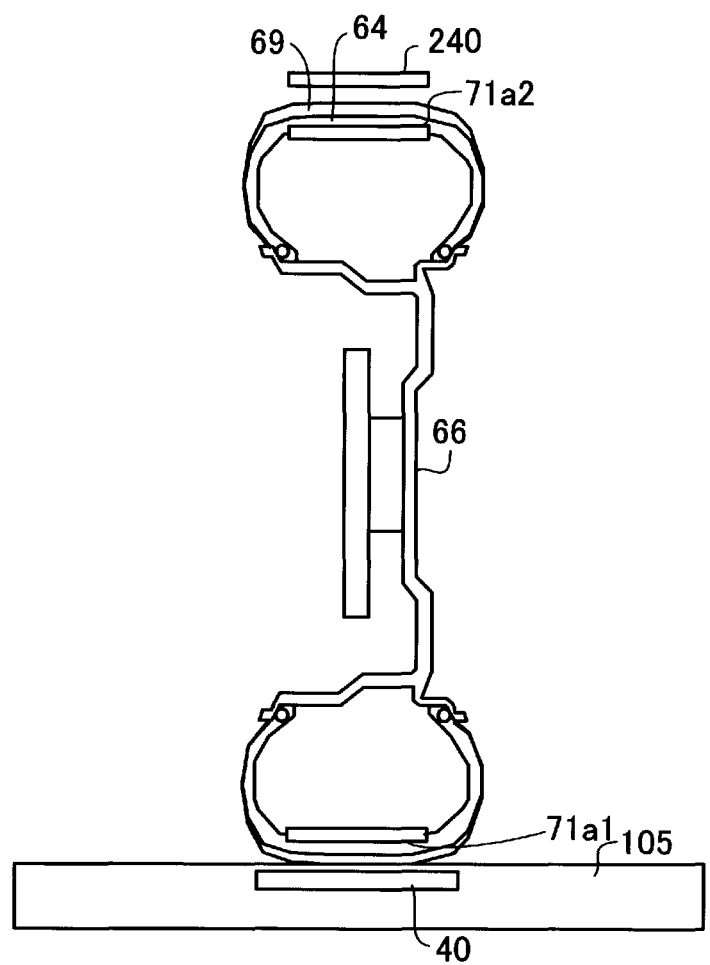
FIG. 3A is an explanatory diagram illustrating an arrangement position of the relay coil in a tread portion type.

As shown in FIG. 3A, the tread portion type includes the relay coils 71*a*1 and 71*a*2. The tire 60 ordinarily includes a steel belt 64 to enhance rigidity. The relay coils 71*a*1 and 71*a*2 are arranged on an inner side of the steel belt 64 of the tire 60. Here, the steel belt 64 is formed from a non-conductive material. If the steel belt 64 is formed from a non-conductive material, eddy currents can be suppressed from being generated in the steel belt 64 due to variations in the magnetic fluxes φ that pass through the relay coils 71*a*1 and 71*a*2.

In addition, in the tread portion type, the relay coils 71*a*1 and 71*a*2 may be formed as a portion of the steel belt 64 and used as a member that provides functions of the steel belt 64. Because the relay coils 71*a*1 and 71*a*2 and the steel belt 64 can be used in combination, the tire 60 can be reduced in weight and unsprung weight can be reduced.

In a wheel-attached type in FIG. 2, the relay circuit 70 is arranged along a circumference of a wheel rather than the tire 60 itself. It can be said that the relay circuit 70 is arranged on an outer circumference of the tire 60 in the tread portion type, and the relay circuit 70 is arranged on an inner circumference of the tire 60 in the wheel-attached type. The wheel-attached type is advantageous in that, even when the tire 60 that is a consumable item is replaced, the relay circuit 70 can be used as is if the wheel is not replaced.

Figure 3B:
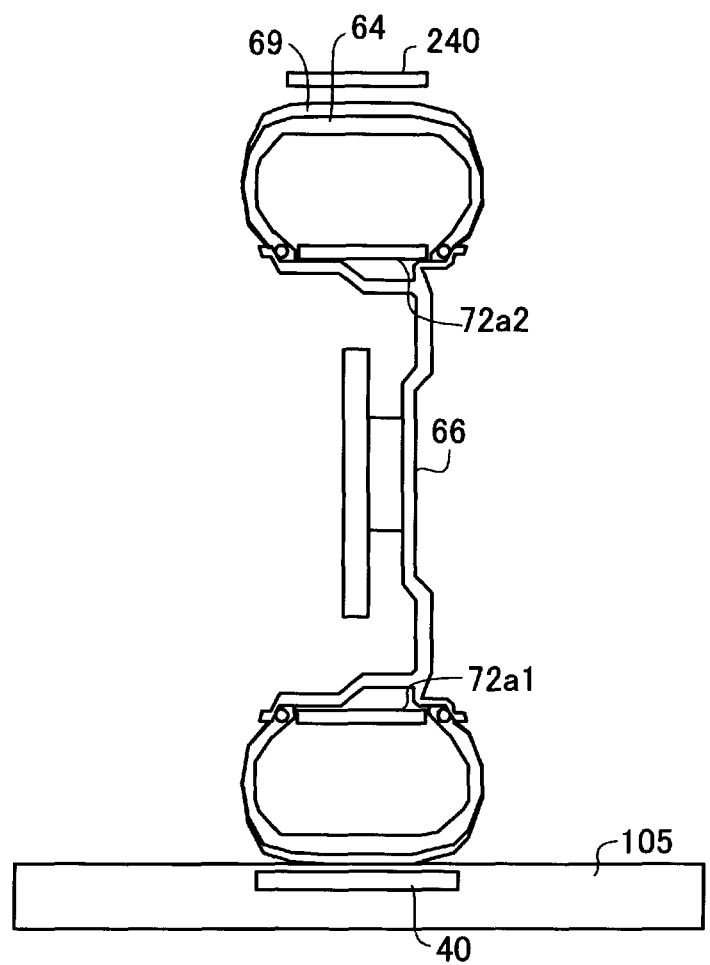
FIG. 3B is an explanatory diagram illustrating an arrangement position of the relay coil in a wheel-attached type.

As shown in FIG. 3B, the wheel-attached type includes relay coils 72*a*1 and 72*a*2. The relay coils 72*a*1 and 72*a*2 are arranged along an outer circumference of a wheel 66.

Figure 4:
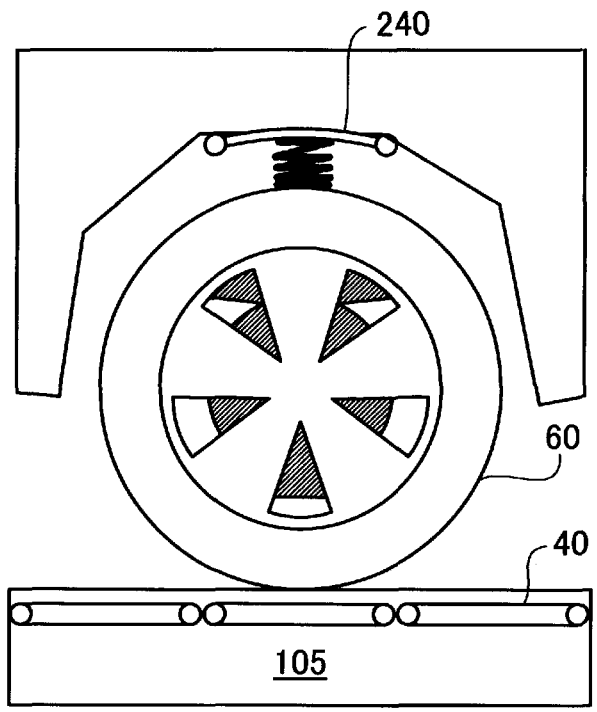
FIG. 4 is an explanatory diagram illustrating an arrangement position of a power reception coil.

In the case of the tread portion type or the wheel-attached type, as shown in FIG. 4, the power reception coil 240 is arranged vertically above the tire 60.

In a side wall type shown in FIG. 2, the relay circuit 70 is provided in a side wall of the tire 60. A gap between the relay circuit 70 and the power transmission coil 40 is midway between the gaps in a tread portion arrangement and wheel attachment. In the side wall type, a plurality of power transmission coils 40 are arrayed along the road 105. An orientation of the magnetic flux of the power transmission coils 40 is the same in a direction along the road 105, but opposite that of the power transmission coils 40 that are adjacent in a direction intersecting the road 105. As a result, the magnetic flux that is emitted from the power transmission coil 40 of a certain row passes through the relay circuit 70 and enters the power transmission circuit 40 of an adjacent row. Therefore, the magnetic flux is easily closed. In addition, because the magnetic flux that passes through the relay circuit does not pass through the wheel 66, eddy currents are not generated in the wheel 66, and loss due to eddy currents can be reduced.

Figure 3C:
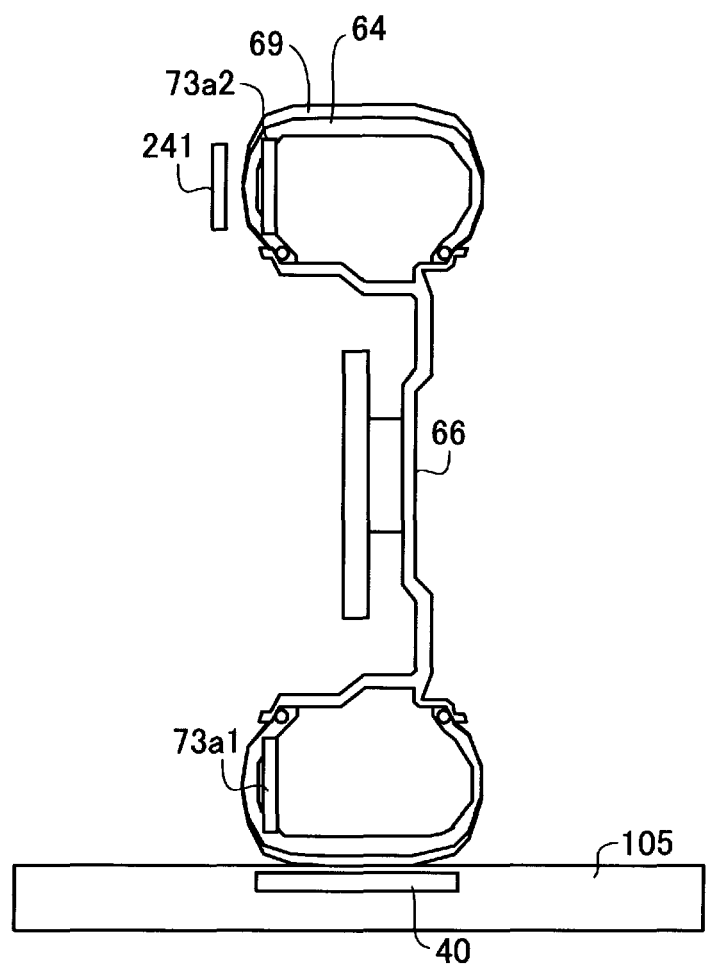
FIG. 3C is an explanatory diagram illustrating an arrangement position of the relay coil in a side wall type.
Figure 3D:
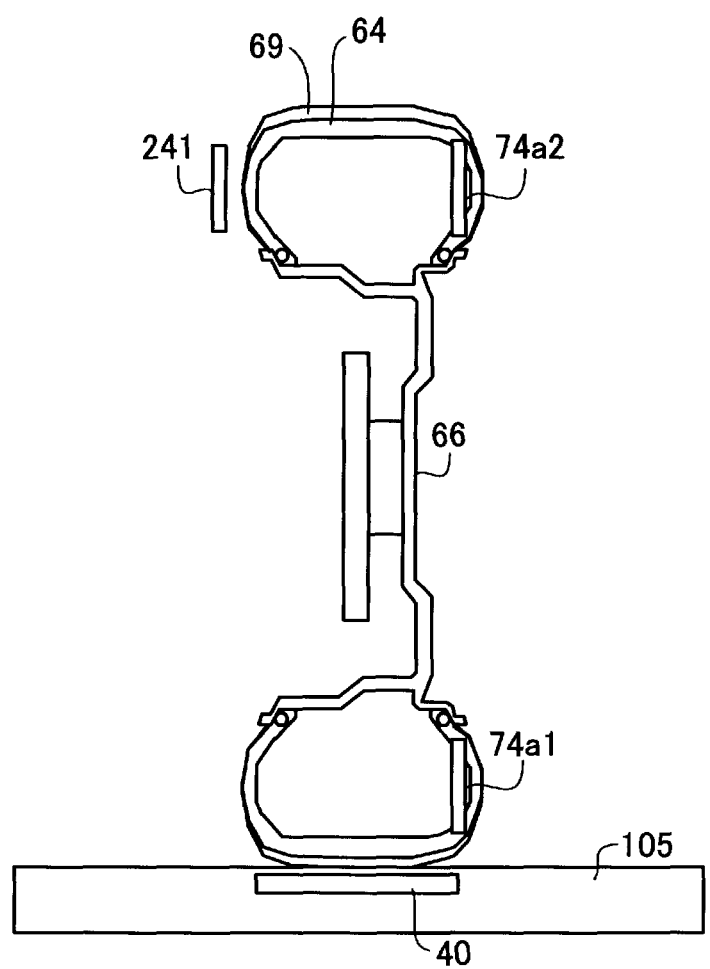
FIG. 3D is an explanatory diagram illustrating another arrangement position of the relay coil in the side wall type.
Figure 5:
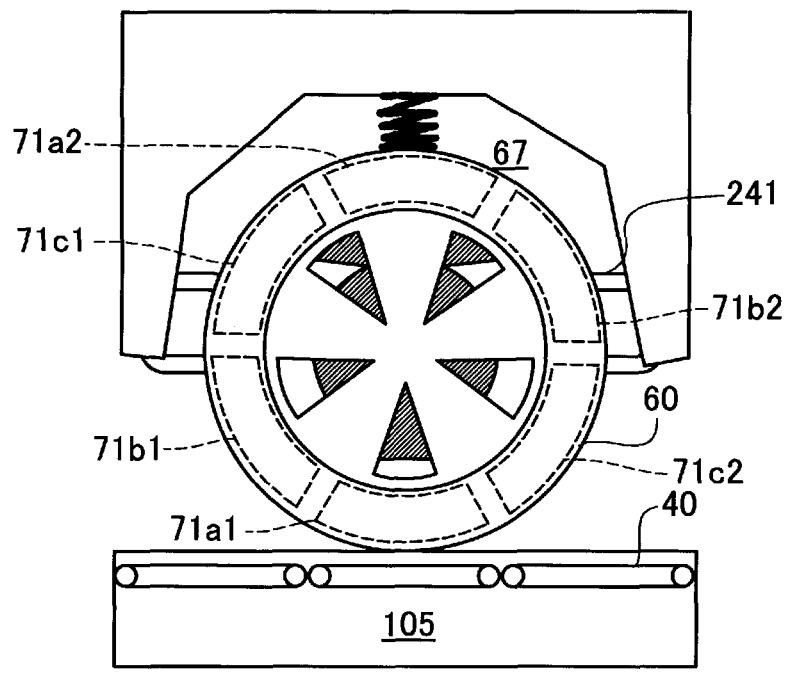
FIG. 5 is an explanatory diagram of illustrating an arrangement position of the power reception coil in the side wall type.

As shown in FIG. 3C, the side wall type includes relay coils 73*a*1 and 73*a*2. The relay coils 73*a*1 and 73*a*2 are arranged on a surface of the tire 60 on an inner side of the vehicle 202. Here, the side wall type may be configured to include relay coils 74*a*1 and 74*a*2 shown in FIG. 3D instead of the relay coils 73*a*1 and 73*a*2 or in addition to the relay coils 73*a*1 and 73*a*2. The relay coils 74*a*1 and 74*a*2 are arranged on a surface of the tire 60 on an outer side of the vehicle 202. In the case of the side wall type, as shown in FIG. 5, a power reception coil 241 is arranged on a surface of a tire house 67 that faces the tire 60.

In a solenoid type shown in FIG. 2, a plane that is formed by the relay circuit 70 is in a radial direction of a front wheel tire. When the solenoid type is used, the orientation of the magnetic flux of adjacent power transmission coils 40 alternates along the road 105. As a result, for example, the magnetic flux that is emitted from one power transmission coil 40 passes through the relay circuit 70 and enters the adjacent power transmission coil 40. Therefore, the magnetic flux can be easily closed. Here, in the case of the solenoid type, the power reception coil 240 is also preferably divided into two. The magnetic flux that passes through the relay circuit 70 passes through the two divided power reception coils 240. In addition, the magnetic flux can be easily closed.

An example of power transfer through the relay circuit 70 in the tread portion type will be described below. Power transfer is similarly performed in other types as well.

Figure 6:
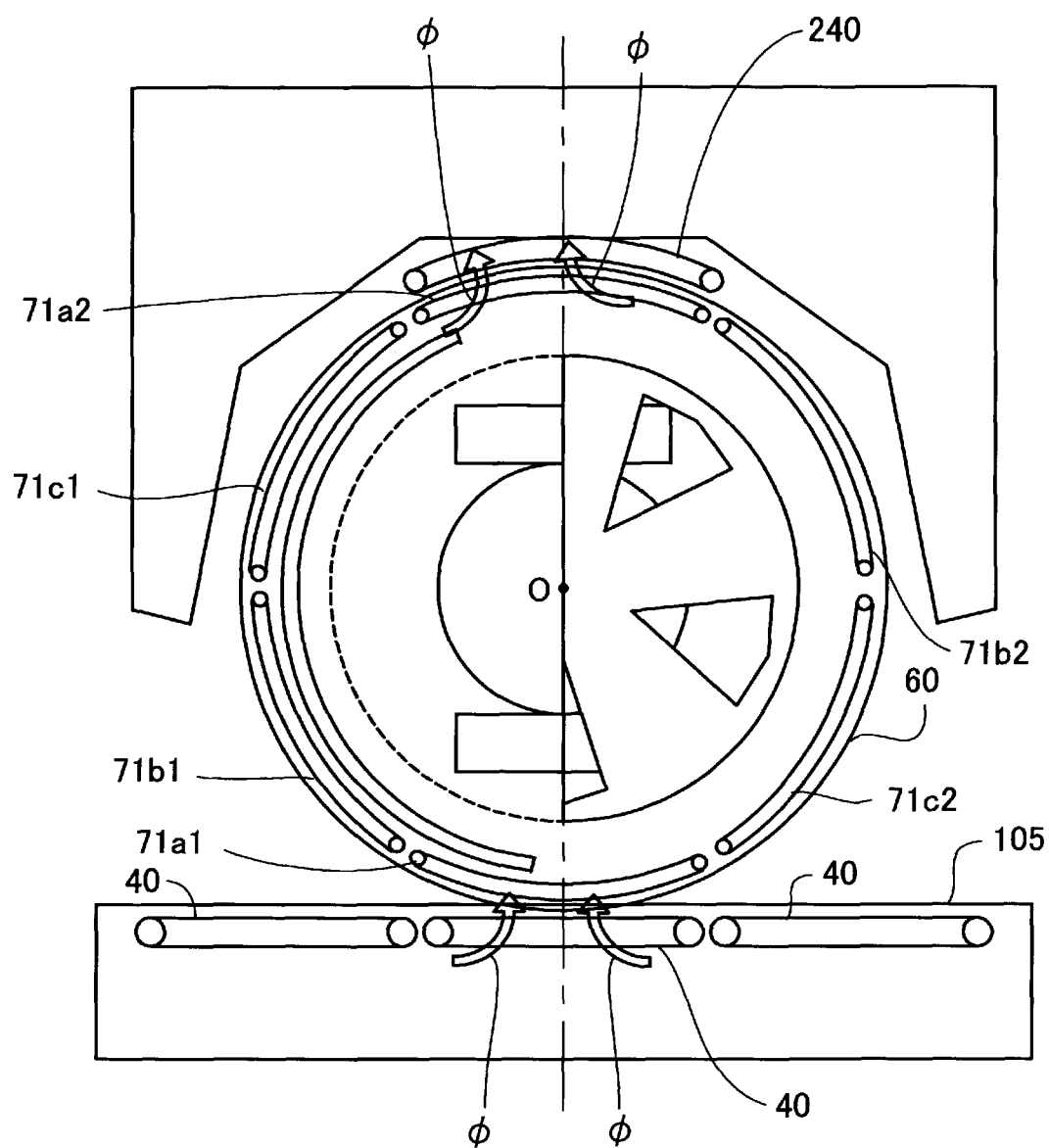
FIG. 6 is a diagram of a cross-section and a partial transparent view of a side surface of the tire in the tread portion type.
Figure 7:
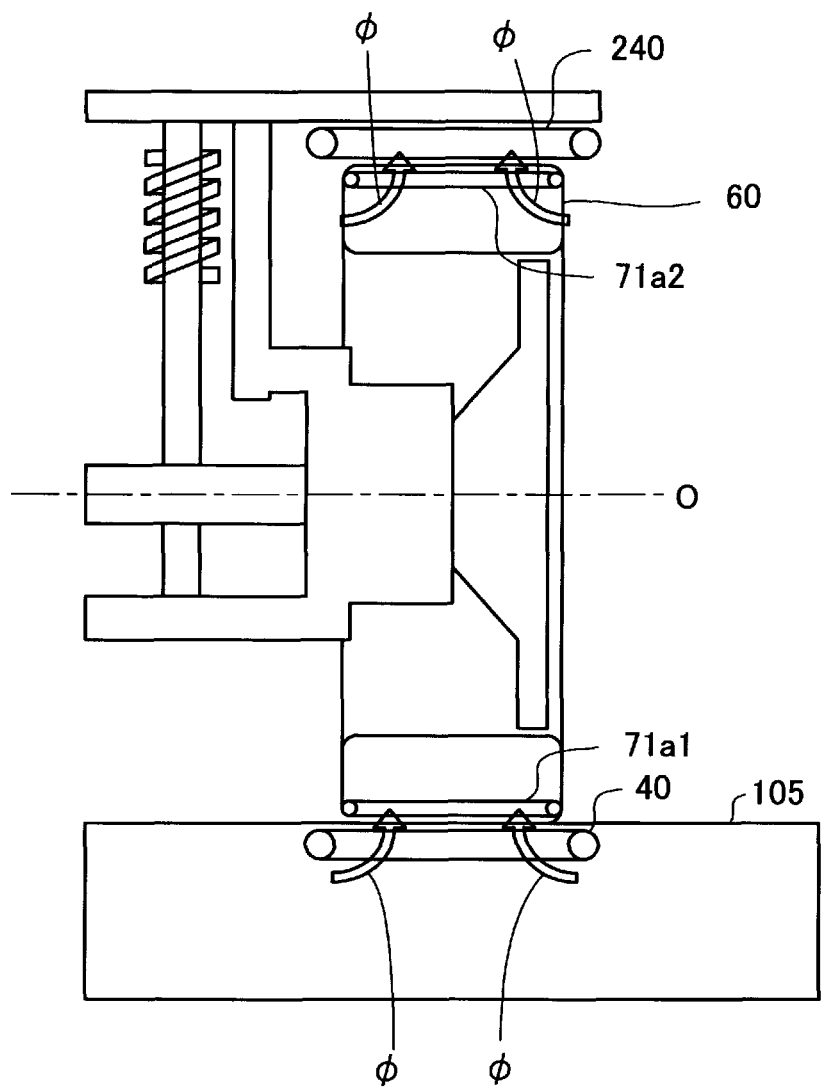
FIG. 7 is a cross-sectional view of the tire in the tread portion type.

As shown in FIG. 6 and FIG. 7, the tire 60 includes six relay coils 71*a*1, 71*a*2, 71*b*1, 71*b*2, 71*c*1, and 71*c*2. A single relay circuit 70 is configured by the relay coils 71*a*1 and 71*a*2. The relay coils 71*b*1 and 71*b*2 and the relay coils 71*c*1 and 71*c*2 also respectively configure the relay circuits 70. When differentiation among the six relay coils 71*a*1, 71*a*2, 71*b*1, 71*b*2, 71*c*1, and 71*c*2 is not made, the relay coil is referred to as a relay coil 71. The relay coils 71*a*1 and 71*a*2 are in point symmetrical positions relative to a rotation center O of the tire 60. The relay coils 71*b*1 and 71*b*2 and the relay coils 71*c*1 and 71*c*2 are also similarly in point symmetrical positions relative to the rotational center O of the tire 60. When one relay coil 71*a*1 opposes the power transmission coil 40, the other relay coil 71*a*2 opposes the power reception coil 240. This similarly applies to the relay coils 71*b*1 and 71*b*2 and the relay coils 71*c*1 and 71*c*2 as well. As described hereafter, the relay coils 71*a*1 and 71*a*2 are connected in series. When the relay coil 71*a*1 opposes the power transmission coil 40, the relay coil 71*a*2 opposes the power reception coil 240. At this time, the magnetic flux φ that is generated in the power transmission coil 40 penetrates the relay coil 71*a*1. The relay coil 71*a*1 generates an induced current and electric power is transferred from the power transmission coil 40 to the relay coil 71*a*1. When electric power is transferred to the relay coil 71*a*1, the current also flows to the relay coil 71*a*2 that is connected in series to the relay coil 71*a*1, and the magnetic flux φ is generated. The magnetic flux φ that is generated in the relay coil 71*a*2 passes through the power reception coil 240, and electric power is transferred from the relay coil 71*a*2 to the power reception coil 240. That is, when the tire 60 rotates 180° and the relay coil 71*a*2 opposes the power transmission coil 40, the relay coil 71*a*1 that is in a symmetrical position opposes the power reception coil 240. This similarly applies to the relay coils 71*b*1 and 71*b*2 and the relay coils 71*c*1 and 71*c*2 as well.

Figure 8:
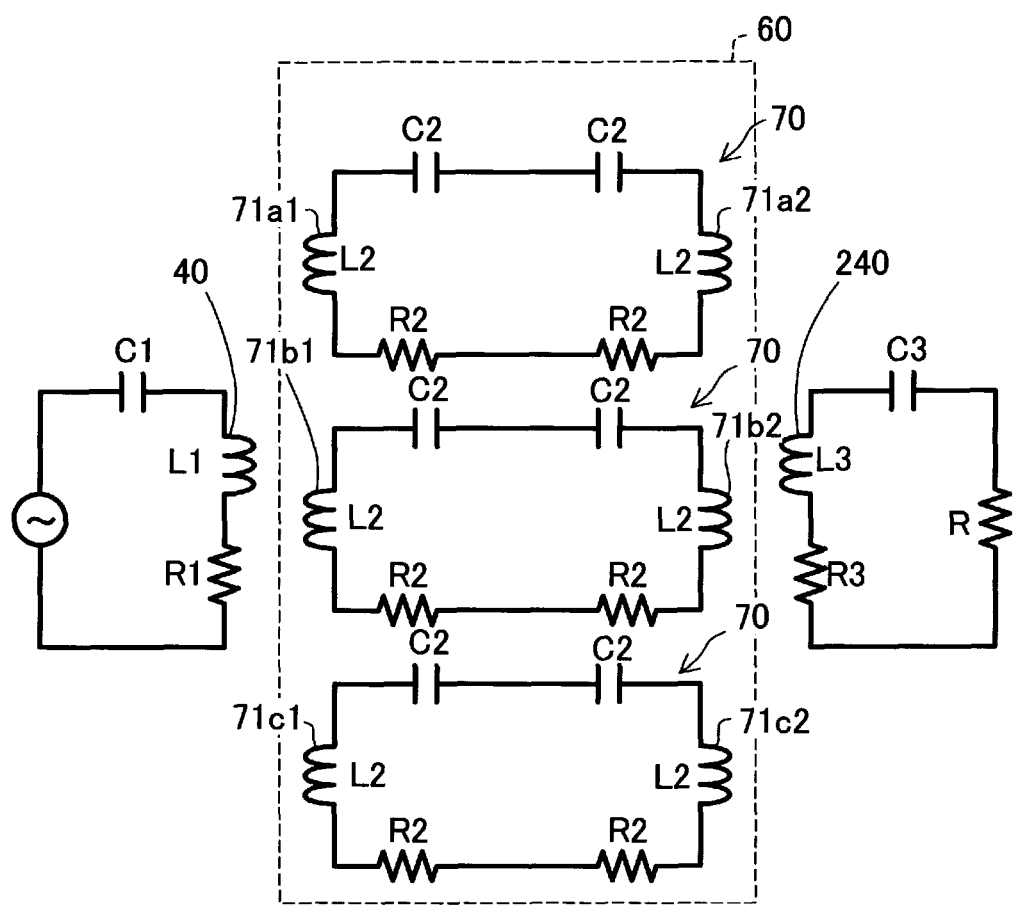
FIG. 8 is an equivalent circuit of a power transmission coil, the relay coil, and the power reception coil.

FIG. 8 shows the relay circuit 70 shown in FIG. 2 in further detail. As shown in FIG. 8, the relay coils 71*a*1 and 71*a*2 may configure a single relay circuit 70 by being connected in series with two resonance capacitors C2 therebetween. Here, in FIG. 1 to FIG. 7, illustration of the capacitors is omitted. The relay coils 71b1 and 71b2 and the relay coils 71c1 and 71c2 similarly respectively configure the relay circuits 70 by being connected in series with two resonance capacitors C2 therebetween. That is, a single tire 60 includes three relay circuits 70. Here, a number of relay circuits 70 that are provided in the tire 60 is not limited to three and is merely required to be one or more. A resonance capacitor C1 is connected in series to the power transmission coil 40, and a resonance capacitor C3 is connected in series to the power reception coil 240. Regarding the power transmission coil and the power reception coil, the resonance capacitor may be connected in parallel to the coil. A filter or the like may be provided in an earlier stage from the power transmission coil and a later stage from the power reception coil.

When inductance of the power transmission coil 40 is L1, electrical resistance of the power transmission coil 40 and wiring is R1, and inductance of the relay coil 71a1 is L2, impedance Z1 in a circuit that includes the power transmission coil 40 on the road 105 side is expressed by $$Z1 = R1 + j(\omega 1 \cdot La - 1/(\omega 1 \cdot C1))$$
$$La = L1 + L2 \pm 2Ma = L1 + L2 \pm 2ka(L1 \cdot L2)^{1/2}.$$

Here, ω1 is an angular frequency, Ma is mutual inductance between the power transmission coil 40 and the relay coil 71a1, and ka is a coupling coefficient of the power transmission coil 40 and the relay coil 71a1. Here, the mutual inductance Ma and the coupling coefficient ka are values that vary based on a rotation angle of the tire 60. The [±] sign before the mutual inductance Ma is [+] when winding directions of the two coils around the penetrating magnetic flux φ are the same, and [−] when the winding directions are opposite. In addition, a relationship expressed by $$\omega 1 = 2\varpi f1$$

is established with a frequency f1 of the voltage that is applied to the power transmission coil 40.

In the above-described expression, the frequency f1 at which Z1 is smallest is $$f1 = 1/(2\varpi(La \cdot C1)^{1/2}).$$

When inductance of the power reception coil 240 is L3, electrical resistance of the power reception coil 240 and wiring is R3, and electrical resistance other than that of a resonance circuit is R, impedance Z3 in a circuit that includes the power reception coil 240 is expressed by $$Z3 = R3 + R + j(\omega 3 \cdot Lc - 1/(\omega 3 \cdot C3))$$
$$Lc = L2 + L3 \pm 2Mc = L2 + L3 \pm 2kc(L2 \cdot L3)^{1/2}.$$

A frequency f3 at which Z3 is smallest is $$f3 = 1/(2\varpi(Lc \cdot C3)^{1/2}).$$

When inductance of the relay coils 71a1 and 71a2 is L2, electrical resistance of the relay coils 71a1 and 71a2 and wiring is R2, and inductance of the power reception coil 240 is L3, impedance Z2 in a circuit that includes the relay coils 71a1 and 71a2 and the two resonance capacitors C2 is expressed by $$Z2 = 2R2 + j(\omega 2 \cdot Lb - 2/(\omega 2 \cdot C2))$$
$$Lb = La + Lc.$$

Here, a frequency f2 at which Z2 is smallest is $$f2 = 1/(2\varpi(Lb \cdot C2)^{1/2}).$$

This similarly applies to a circuit that includes the relay coils 71b1 and 71b2, and a circuit that includes the relay coils 71c1 and 71c2.

Here, when the resonance frequencies f1, f2, and f3 are the same as an applied frequency of the voltage that is applied to the power transmission coil 40, electric power can be efficiently transmitted from the power transmission coil 40 to the relay coil 71a1, and electric power can be efficiently transmitted from the relay coil 71a2 to the power reception coil 240. Here, the frequencies f1, f2, and f3 need not completely match and may be frequencies that are within a fixed range that is centered on a resonance frequency at which the inductance Lb of the relay circuit 70 that includes the relay coils 71a1 and 71a2 described hereafter is a local maximum. In addition, a difference between the inductance when the power transmission coil 40 and the relay coil 71a1 oppose each other and the inductance when the relay coil 71a2 and the power reception coil 240 oppose each other may be equal to or less than an amount that is prescribed in advance.

Figure 9:
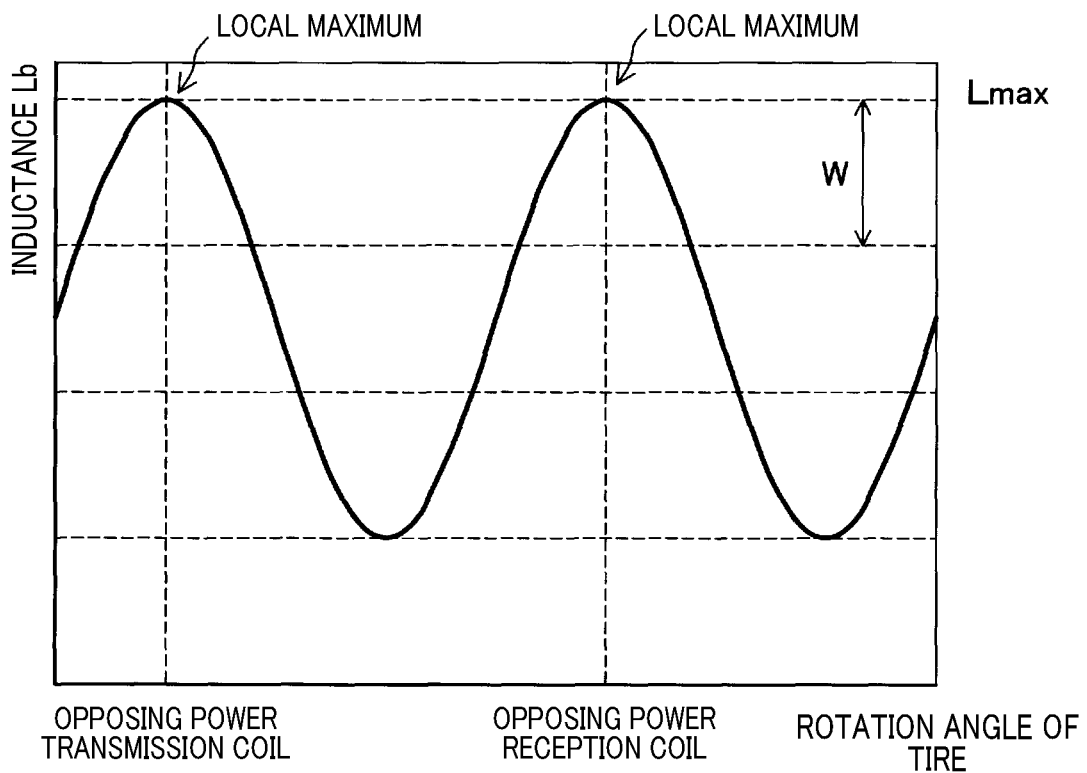
FIG. 9 is a graph illustrating a relationship between a rotation angle of the tire and inductance.

FIG. 9 shows the inductance Lb of the relay circuit 70 that includes the relay coils 71a1 and 71a2. The inductance Lb is a local maximum when the relay coils 71a1 and 71a2 are in the positions that oppose the power transmission coil 40 and the power reception coil 240. This is because, as shown in FIG. 6 and FIG. 7, the magnetic flux φ that passes through the power transmission coil 40 and the relay coil 71a1 is a local maximum and the magnetic flux φ that passes through the relay coil 71a2 and the power reception coil 240 is a local maximum when the relay coil 71a1 is in the position that opposes the power transmission coil 40. When the tire 60 rotates and the relay coil 71a1 shifts from the position that opposes the power transmission coil 40 and the relay coil 71a2 shifts from the position that opposes the power reception coil 240, the inductance Lb decreases. Subsequently, when the tire 60 rotates to a position in which the relay coil 71a1 opposes the power reception coil 240 and the relay coil 71a2 opposes the power transmission coil 40, the inductance Lb becomes a local maximum. This is because the magnetic flux φ that passes through the power transmission coil 40 and the relay coil 71a2 becomes a local maximum, and the magnetic flux φ that passes through the relay coil 71a1 and the power reception circuit 240 becomes a local maximum.

Here, a capacitance of the resonance capacitor C2 is set to a local maximum Lmax of the inductance Lb or a capacitance that is within a range from the local maximum Lmax of the inductance Lb to a design value W. As a result, when the tire 60 rotates, the inductance Lb decreases based on the rotation angle, resonance is broken, and the impedance Z2 increases. Consequently, a current I that flows to the relay coils 71a1 and 71a2 decreases, and loss can be reduced.

The design value W is determined in a following manner. When the number of relay coils 71 that are included in the tire 60 is N, the design value W is 2Lmax/N. The capacitance of the resonance capacitor C2 is a capacitance in which the inductance Lb falls within a range from Lmax to Lmax (1-2/N). In the example shown in FIG. 6 and FIG. 7, the value of N is 6. Therefore, the capacitance of the resonance capacitor C2 is a capacitance in which the inductance Lb falls within a range from Lmax to 2Lmax/3. As a result, while the relay coils 71a1 and 71a2 are transferring electric power, the resonance in the circuit that includes the relay coils 71b1 and 71b2 and the circuit that includes the relay coils 71c1 and 71c2 is broken. Therefore, a current does not easily flow to the relay coils 71b1, 71b2, 71c1, and 71c2. Loss can be reduced and power transfer efficiency can be improved. This similarly applies to when the relay coils 71b1 and 71b2 transfer electric power and when the relay coils 71c1 and 71c2 transfer electric power.

In this manner, if the capacitance of the resonance capacitor C2 is a capacitance in which the resonance frequency of the power transmission coil 40, the power reception coil 240, and the relay coils 71a1 to 71c2 is a frequency within a fixed range that is centered on a frequency that is prescribed in advance, loss can be reduced and power transfer efficiency can be improved.

Figure 10:
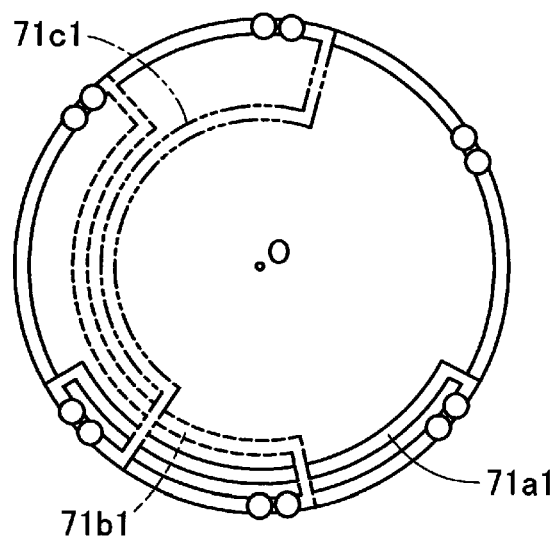
FIG. 10 is an explanatory diagram illustrating another example of a manner of winding of the relay coil.

As shown in FIG. 10, a size in a circumferential direction of the relay coils 71a1, 71b1, and 71c1 may be slightly smaller than half a circumference, and portions thereof may overlap. Here, in FIG. 10, illustration of the relay coils 71a2, 71b2, and 71c2 is omitted. However, regarding the relay coils 71a2, 71b2, and 71c2 as well, the size in the circumferential direction is slightly smaller than half the circumference, portions thereof overlap, and the relay coils 71a2, 71b2, and 71c2 are provided in positions that are point-symmetrical to the relay coils 71a1, 71b1, and 71c1 relative to the rotational center O of the tire 60.

In this case, because time over which the magnetic flux in a vertical direction penetrates the relay coils 71a1 to 71c2 can be increased, power transfer efficiency can be further improved.

According to the above-described embodiment, the relay coils 71a1 and 71a2 are electrically connected by being connected by wiring. However, the relay coils 71a1 and 71a2 may not be connected by wiring and may not be electrically connected. When the relay coil 71a1 opposes the power transmission coil 40, electrical energy is accumulated in the relay coil 71a1 and the resonance coil C2. Subsequently, when the tire 60 rotates and the relay coil 71a1 opposes the power reception coil 240, the electrical energy that is accumulated in the relay coil 71a1 and the resonance coil C2 is transferred to the power reception coil 240. Here, the relay coils 71a1 and 71a2 being connected by wiring is preferable because electrical energy can be transferred from the relay coil 71a2 to the power reception coil 240 simultaneously with the relay coil 71a1 receiving the transfer of electrical energy from the power transmission coil 40.

Figure 11:
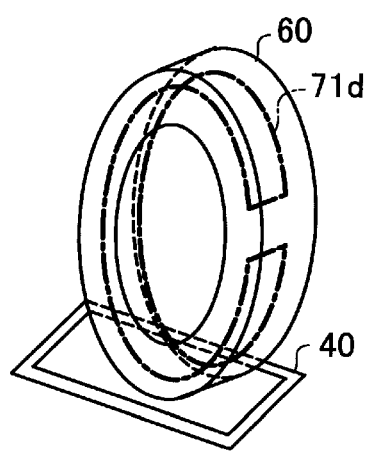
FIG. 11 is an explanatory diagram illustrating another example of a manner of winding of the relay coil.

According to the above-described embodiment, each relay circuit 70 includes two relay coils, such as the relay coils 71a1 and 71a2. However, as shown in FIG. 11, the relay circuit 70 may be configured to include a single relay coil 71d.

Second Embodiment

Figure 12:
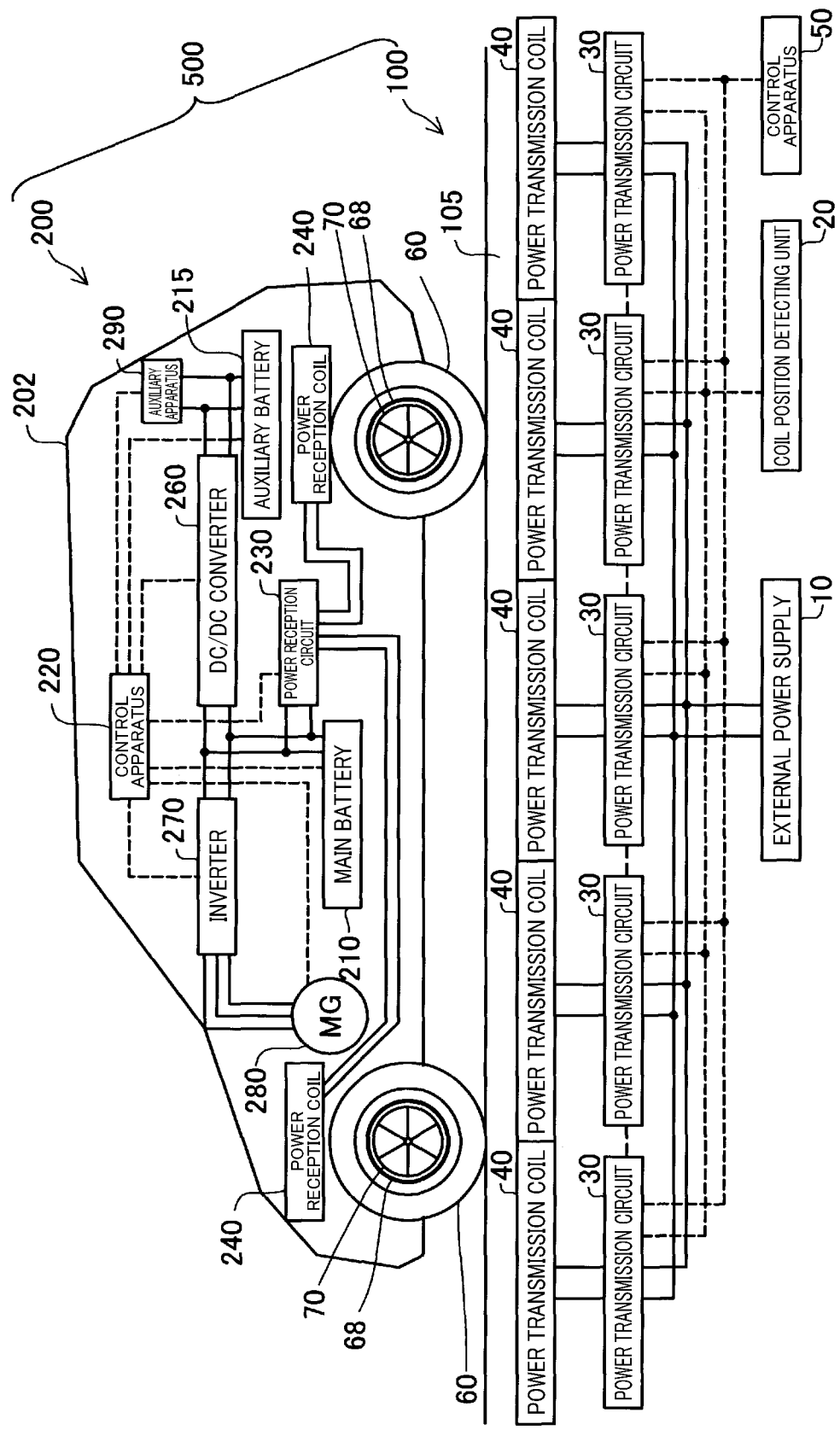
FIG. 12 is an explanatory diagram illustrating an example in which the relay coil is provided in a wheel cap.

As shown in FIG. 12, the relay circuit 20 may be provided in a wheel cap 68 of the tire 60. Electric power can be similarly transferred from the power transmission coil 40 to the power reception coil 240 through the relay circuit 70.

Third Embodiment

Figure 13:
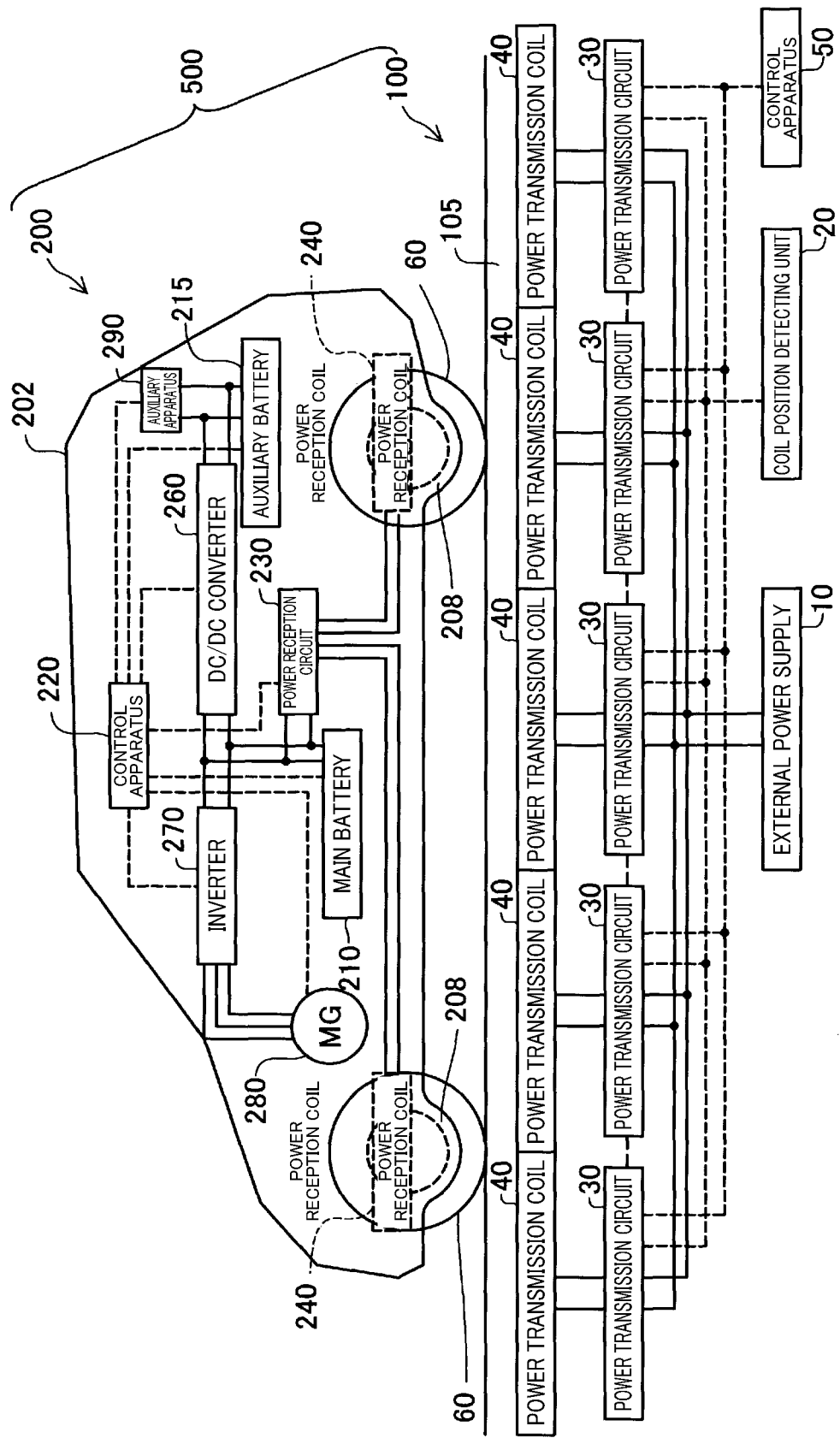
FIG. 13 is an explanatory diagram illustrating an example in which the power reception coil is provided in a fender cover.

As shown in FIG. 13, the vehicle 202 may include a fender cover 208 that covers a tire from an outer side and be configured such that the power reception coil 240 is provided on the tire 60 side of the fender cover 208. In this case, the power reception coil 240 may be provided in only the fender cover of the tire 60 that is not a steering wheel. This is because power transfer is not easily affected by steering of the tire 60.

Other Embodiments

Figure 14:
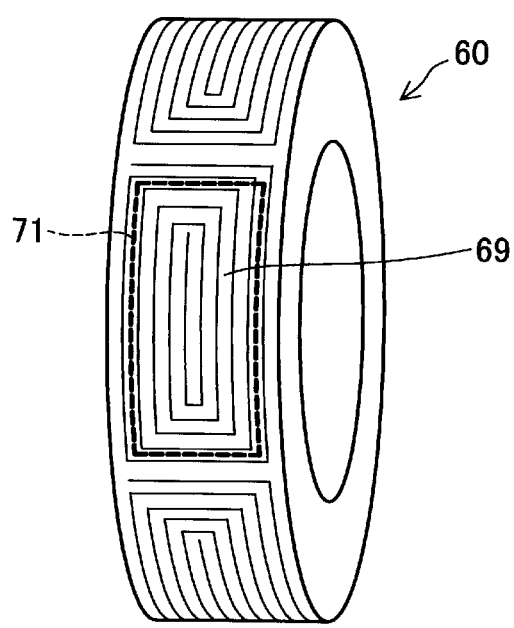
FIG. 14 is an explanatory diagram illustrating an example in which a shape pattern of the relay coil matches a shape pattern of the tread portion.
Figure 15:
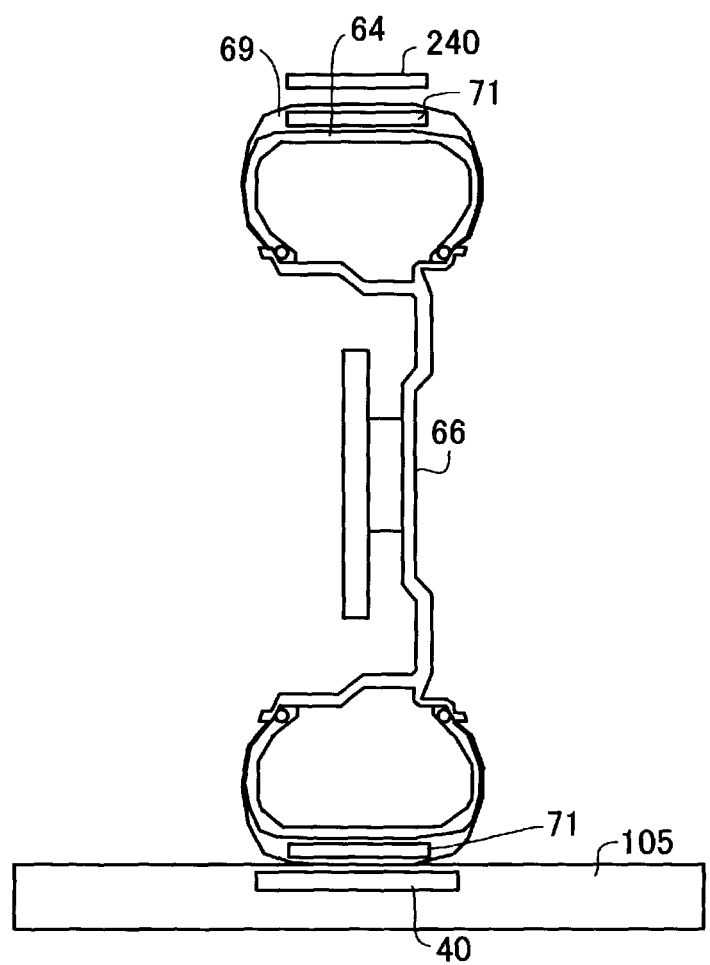
FIG. 15 is a cross-sectional view of the tire shown in FIG. 14.

In an example shown in FIG. 14 and FIG. 15, a shape pattern that indicates a shape of the relay coil 71 is identical to a shape pattern of a tread portion 69 of the tire 60. The relay coil 71 is arranged such as to match the shape pattern of the tread portion 69.

FIG. 15 shows a cross-section of the tire in FIG. 14. The relay coil 71 is provided in the tread portion 69 further toward the outer circumferential side than the steel belt 64 is. When the relay coil 71 is provided in the tread portion 69 further toward the outer circumferential side than the steel belt 64 is, a distance between the power transmission coil 40 and the power reception coil 240, and the relay coil 71 can be further reduced. Therefore, power transfer efficiency can be improved. In addition, the steel belt 64 may be covered by a conductive shield. When the steel belt 64 is covered by a conductive shield, because the magnetic flux does not penetrate the steel belt 64, eddy currents are not easily generated in the steel belt 64. In addition, here, a yoke may be provided between the relay coil 71 and the steel belt 71. The magnetic flux is blocked by the yoke and does not penetrate the steel belt 64.

According to the above-described embodiments, although the power reception coil 240 is provided in correspondence to front and rear tires 60, only the power reception coil 240 that corresponds to the tire 60 of a front wheel or only the power reception coil 240 that corresponds to the tire 60 of a rear wheel may be provided.

According to the above-described embodiments, the number of relay coils 71 is described as being six. However, the number may be a plurality that is two or more. In addition, according to the above-described embodiments, two relay coils 71 that are in point symmetrical positions are connected in series. However, for example, the number of relay coils 71 may be 3n, and three relay coils 71 that are in three rotationally symmetrical positions may be connected in series.

The control apparatus and the method thereof described in the present disclosure may be actualized by a dedicated computer that is provided such as to be configured by a processor and a memory, the processor being programmed to provide one or a plurality of functions that are realized by a computer program. Alternatively, the control apparatus and the method thereof described in the present disclosure may be actualized by a dedicated computer that is provided by a processor being configured by a single dedicated hardware logic circuit or more. As another alternative, the control apparatus and the method thereof described in the present disclosure may be actualized by a single dedicated computer or more, the dedicated computer being configured by a combination of a processor that is programmed to provide one or a plurality of functions, a memory, and a processor that is configured by a single hardware logic circuit or more. In addition, the computer program may be stored in a non-transitory computer-readable storage medium that can be read by a computer as instructions performed by the computer.

The present disclosure is not limited to the above-described embodiments and can be actualized through various configurations without departing from the spirit of the disclosure. For example, technical features according to embodiments that correspond to technical features in each aspect described in the summary of the invention can be replaced and combined as appropriate to solve some or all of the above-described issued or to achieve some or all of the above-described effects. Furthermore, the technical features may be omitted as appropriate unless described as a requisite in the present specification.

What is claimed is:

1. A dynamic wireless power transfer system comprising:
   a power transmission coil that is provided in a road;
   a power transmission circuit that supplies electric power to the power transmission coil;
   a power reception coil that is provided in a vehicle;
   a power reception circuit that is connected to the power reception coil; and
   a relay circuit that transfers electric power between the power transmission coil and the power reception coil, wherein:
   the relay circuit includes a relay coil that is provided in a tire of the vehicle;
   the tire includes a steel belt;
   the relay coil is provided in a tread portion of the tire that is further toward an outer circumferential side than the steel belt is; and
   the steel belt is covered by a conductive shield.

2. The dynamic wireless power transfer system according to claim 1, wherein:
   the relay coil has a same shape pattern as the tread portion.

3. The dynamic wireless power transfer system according to claim 1, wherein:
   the tire includes a plurality of relay coils.

4. The dynamic wireless power transfer system according to claim 1, wherein:
   the relay coil that receives transfer of electric power from the power transmission coil and the relay coil that transfers electric power to the power reception coil are electrically connected.

5. The dynamic wireless power transfer system according to claim 1, wherein:
   a difference between an inductance when the power transmission coil and the relay coil oppose each other and an inductance when the relay coil and the power reception coil oppose each other is equal to or less than an amount that is prescribed in advance.

6. The dynamic wireless power transfer system according to claim 1, wherein:
   the relay coil includes
   a relay coil that is provided in a front wheel, and
   a relay coil that is provided in a rear wheel; and
   the power reception coil includes
   a power reception coil that corresponds to the relay coil that is provided in the front wheel, and
   a power reception coil that corresponds to the relay coil that is provided in the rear wheel are provided.

7. A dynamic wireless power transfer system comprising:
   a power transmission coil that is provided in a road;
   a power transmission circuit that supplies electric power to the power transmission coil;
   a power reception coil that is provided in a vehicle;
   a power reception circuit that is connected to the power reception coil; and
   a relay circuit that transfers electric power between the power transmission coil and the power reception coil, wherein:
   the relay circuit includes a relay coil that is provided in a tire of the vehicle;
   the tire includes a steel belt; and
   the relay coil is provided as a portion of the steel belt.

8. The dynamic wireless power transfer system according to claim 7, wherein:
   the tire includes a plurality of relay coils.

9. The dynamic wireless power transfer system according to claim 7, wherein:
   the relay coil that receives transfer of electric power from the power transmission coil and the relay coil that transfers electric power to the power reception coil are electrically connected.

10. The dynamic wireless power transfer system according to claim 7, wherein:
    a difference between an inductance when the power transmission coil and the relay coil oppose each other and an inductance when the relay coil and the power reception coil oppose each other is equal to or less than an amount that is prescribed in advance.

11. The dynamic wireless power transfer system according to claim 7, wherein:
    the relay coil includes
    a relay coil that is provided in a front wheel, and
    a relay coil that is provided in a rear wheel; and
    the power reception coil includes
    a power reception coil that corresponds to the relay coil that is provided in the front wheel, and
    a power reception coil that corresponds to the relay coil that is provided in the rear wheel are provided.

12. A dynamic wireless power transfer system comprising:
    a power transmission coil that is provided in a road;
    a power transmission circuit that supplies electric power to the power transmission coil;
    a power reception coil that is provided in a vehicle;
    a power reception circuit that is connected to the power reception coil; and
    a relay circuit that transfers electric power between the power transmission coil and the power reception coil, wherein:
    the relay circuit includes a relay coil that is provided in a tire of the vehicle;
    the tire includes a steel belt; and
    the relay coil is arranged further toward an inner side than the steel belt is.

13. The dynamic wireless power transfer system according to claim 12, wherein:
    the tire includes a plurality of relay coils.

14. The dynamic wireless power transfer system according to claim 12, wherein:

the relay coil that receives transfer of electric power from the power transmission coil and the relay coil that transfers electric power to the power reception coil are electrically connected.

15. The dynamic wireless power transfer system according to claim 12, wherein:
a difference between an inductance when the power transmission coil and the relay coil oppose each other and an inductance when the relay coil and the power reception coil oppose each other is equal to or less than an amount that is prescribed in advance.

16. The dynamic wireless power transfer system according to claim 12, wherein:
the relay coil includes
a relay coil that is provided in a front wheel, and
a relay coil that is provided in a rear wheel; and
the power reception coil includes
a power reception coil that corresponds to the relay coil that is provided in the front wheel, and
a power reception coil that corresponds to the relay coil that is provided in the rear wheel are provided.

* * * * *